No. 12,535. REISSUED OCT. 2, 1906.
F. L. HARMON.
MACHINE FOR SKIVING AND FOLDING LEATHER.
APPLICATION FILED APR. 5, 1905.
4 SHEETS—SHEET 1.
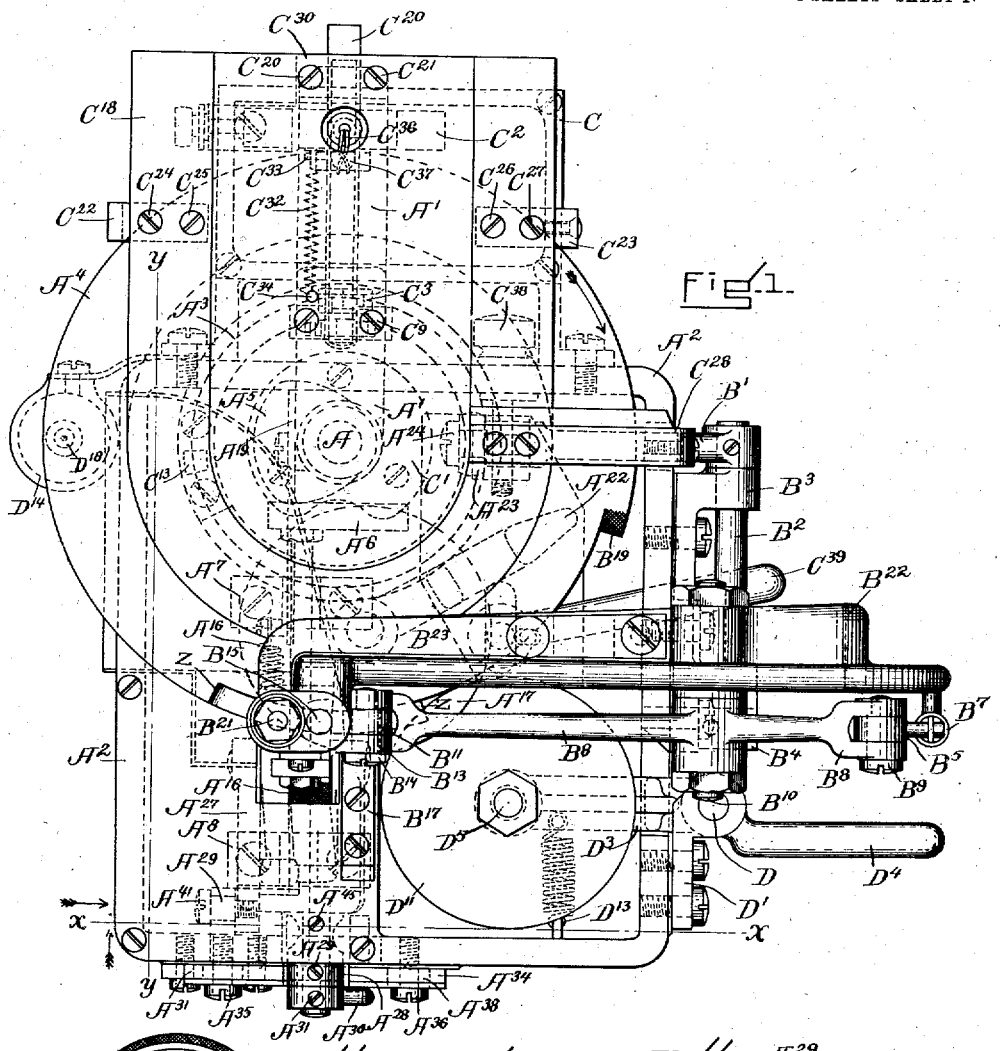
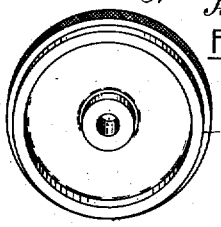
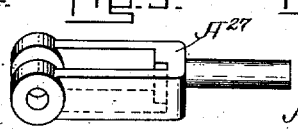
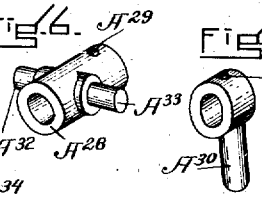
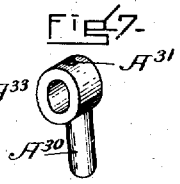
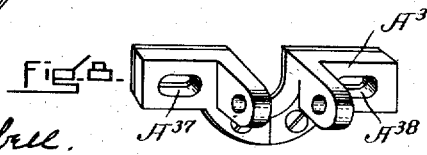
WITNESSES.
Walter P. Abee.
C. C. Stecher.
INVENTOR.
F. L. Harmon
by
Wright, Brown & Quinby
his attys No. 12,535. REISSUED OCT. 2, 1906.
F. L. HARMON.
MACHINE FOR SKIVING AND FOLDING LEATHER.
APPLICATION FILED APR. 5, 1905.
4 SHEETS—SHEET 2.
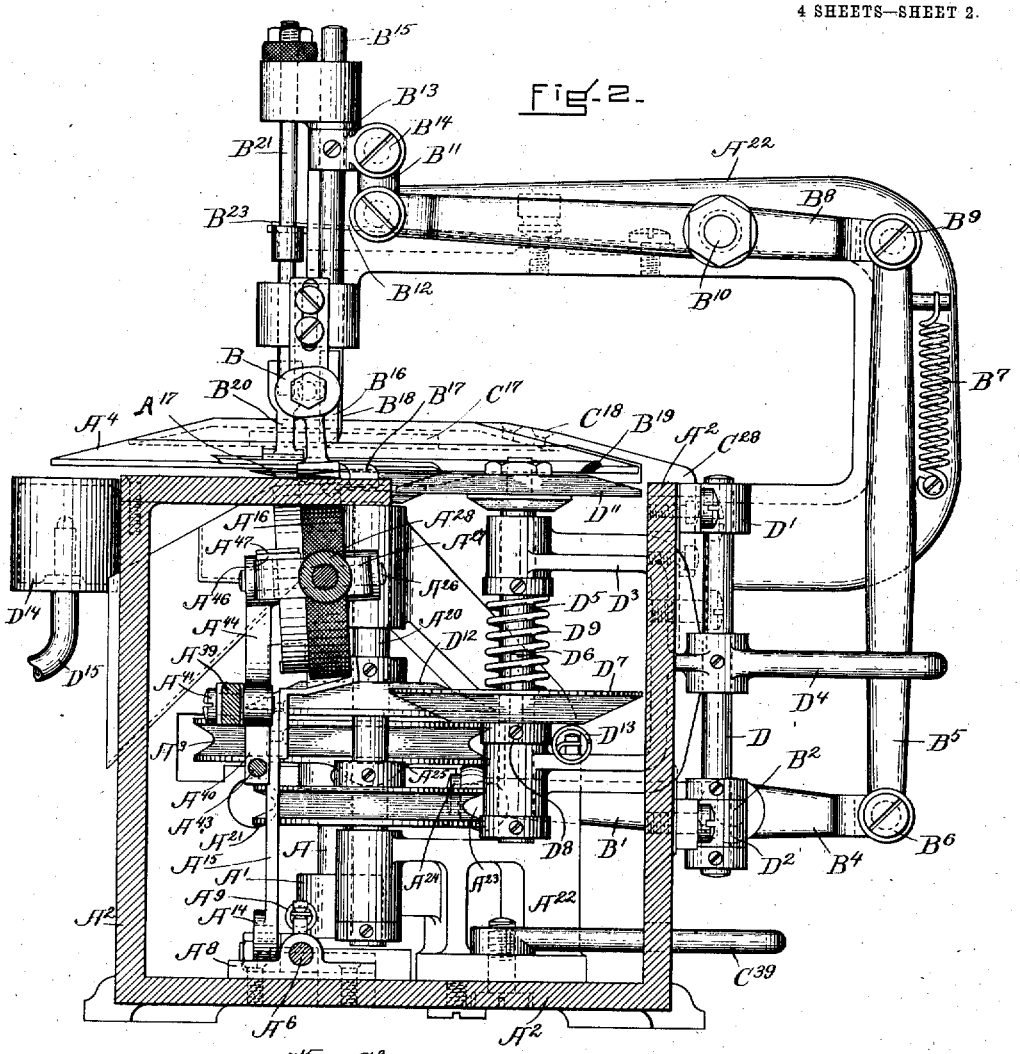
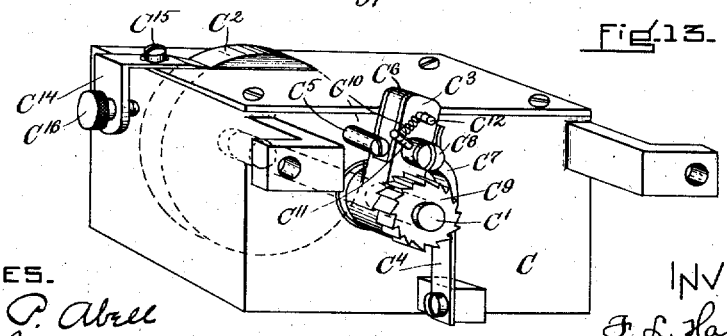
WITNESSES.
Walter P. Abell
C. C. Stecher
INVENTOR
F. L. Harmon
by Wright Brown & Quinby
his attys No. 12,535. REISSUED OCT. 2, 1906.
F. L. HARMON.
MACHINE FOR SKIVING AND FOLDING LEATHER.
APPLICATION FILED APR. 5, 1905.
4 SHEETS—SHEET 3.
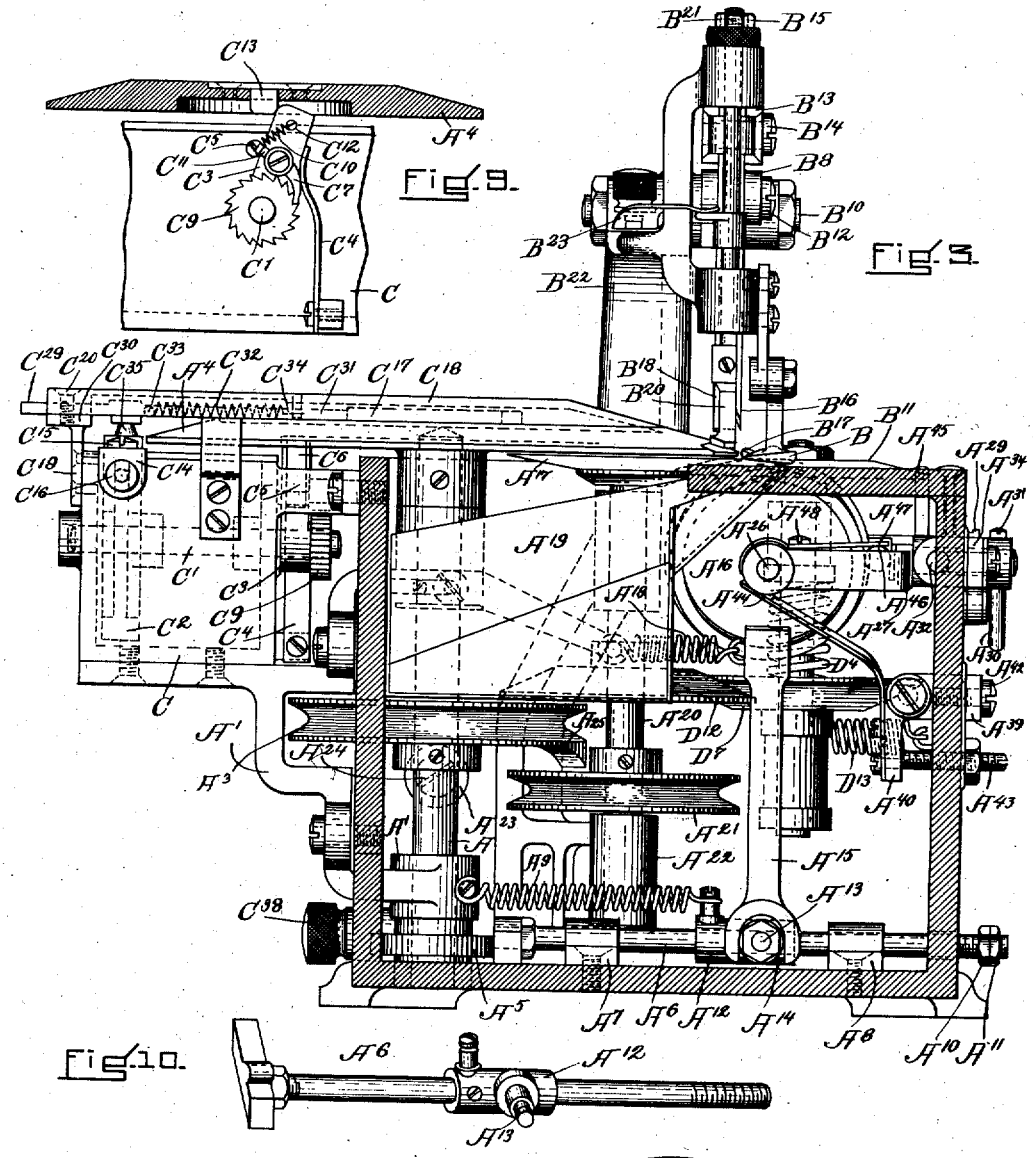
Fig. 9.
Fig. 9.
Fig. 10.
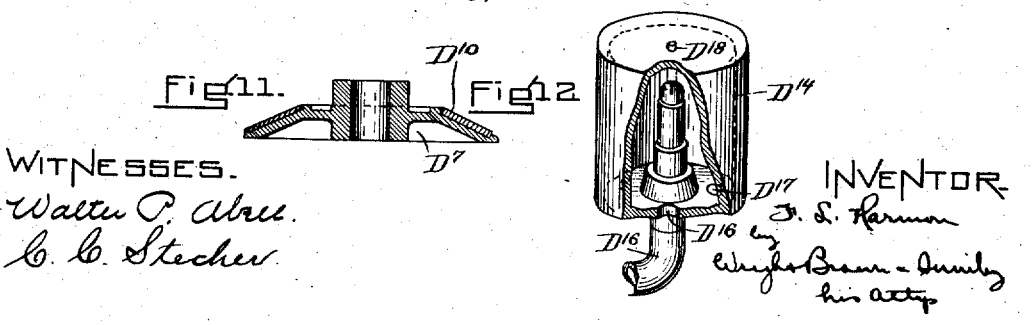
Fig. 11.
Fig. 12.
WITNESSES.
Walter P. Abee.
C. C. Stecher
INVENTOR.
F. L. Harmon
by Wright Brown & Quinby
his attys No. 12,535. REISSUED OCT. 2, 1906.

F. L. HARMON.

MACHINE FOR SKIVING AND FOLDING LEATHER.

APPLICATION FILED APR. 5, 1905.

4 SHEETS—SHEET 4.

WITNESSES.

Walter P. Abee.

C. C. Stecher

INVENTOR.

F. L. Harmon by Wright Brown & Quinby his Attys

UNITED STATES PATENT OFFICE.

FRANK L. HARMON, OF BEVERLY, MASSACHUSETTS.

MACHINE FOR SKIVING AND FOLDING LEATHER.

No. 12,535. Specification of Reissued Letters Patent. Reissued Oct. 2, 1906.

Original No. 731,566, dated June 23, 1903. Application for reissue filed April 5, 1905. Serial No. 254,060.

*To all whom it may concern:*

Be it known that I, FRANK L. HARMON, residing at Beverly, in the county of Essex and Commonwealth of Massachusetts, have invented a new and useful Machine for Skiving and Folding Leather, of which the following is a specification, reference being had to the accompanying drawings.

The object of my invention is to provide a machine for producing a folded edge of a piece of leather; and this invention consists in the novel combinations resulting from the combination of means whereupon a piece of leather may be beveled at its edge, and means whereupon the means for beveling may be sharpened, and means whereupon a piece of leather may be slit at intervals at its edge, and means whereupon cement may be put upon the leather, and means whereupon the beveled part of the leather may be folded, and means whereupon the folded part may be pressed, and means whereupon all of the aforesaid means may operate upon the leather in proper order and form a folded edge upon the leather a predetermined distance.

A machine in which this invention is embodied is comprehensively shown in the accompanying drawings, and the especial features and novel combinations of parts and other novelties will hereinafter appear and be fully set forth and described, and claimed in the claims appended hereto.

Figure 14:
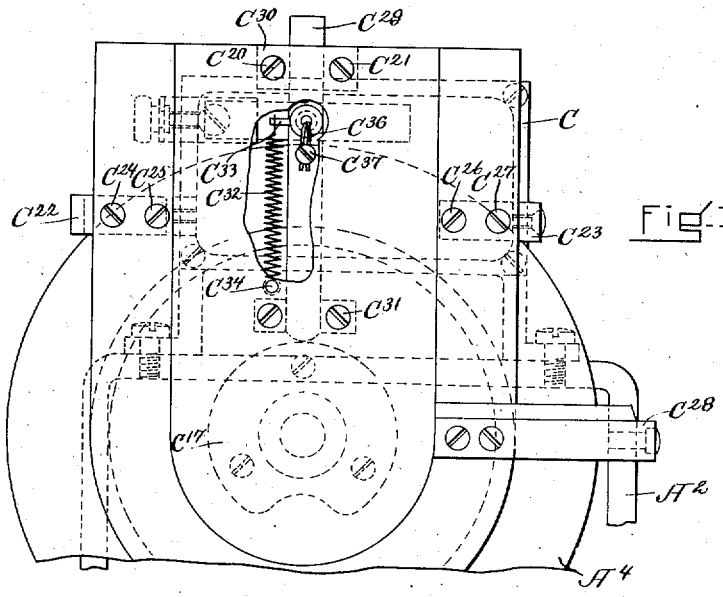
Figure 15:
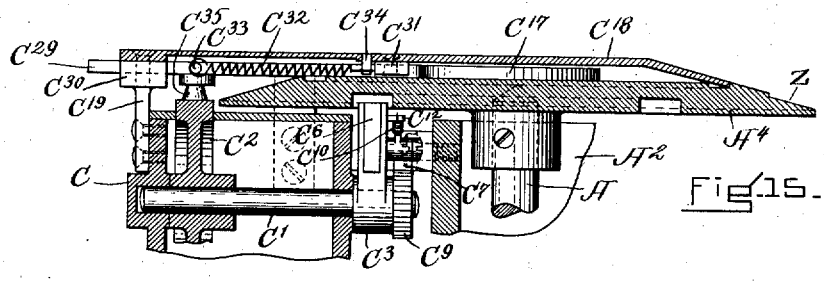
Figure 16:
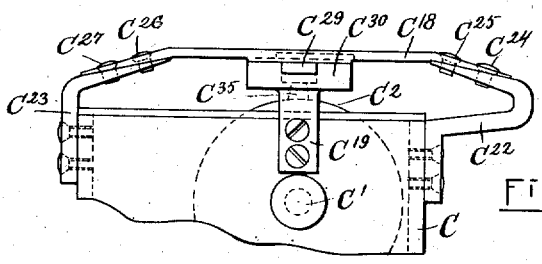
Figure 17:
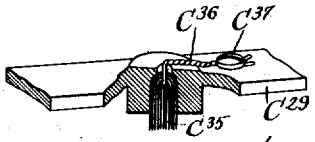

In the accompanying drawings, Figure 1 is a top plan view of the machine embodying this invention. Fig. 2 shows a cross-sectional elevation on line *x x*, indicated by an arrow at the left-hand corner of Fig. 1. Fig. 3 shows a longitudinal sectional elevation on line *y y*, indicated also by an arrow at the left-hand corner of Fig. 1. Fig. 4 is a perspective detail view of a feeding device, and Figs. 5, 6, 7, and 8 show perspective detail views of devices whereupon the feeding device is yieldingly supported and whereupon the feeding device may be manually adjusted or moved and secured at any necessary angle to the cutting edge of a rotatory disk skiving-knife, leaving the feeding device operative, thereby operatively holding the part of the feeding device which moves the leather at any necessary angle to the rotatory disk skiving-knife, so that the piece of leather may be skived at the edge of said leather at any necessary angle. Fig. 9 shows a vertical section of a device by which a piece of leather is folded so as to form a folded edge and is rubbed in a direction inward from said folded edge in operative connection with a part of a cement-receptacle and devices connected therewith, whereupon a proper amount of cement is in practice taken out of said cement-receptacle. Fig. 10 shows the construction of a rod and a sleeve thereon whereupon the feeding device is moved in practice. Fig. 11 shows a vertical section of a wheel whereupon a grinding device is rotated in practice for grinding a rotatory disk skiving-knife. Fig. 12 is a perspective view of a gas-burner for heating the device for rubbing the folded part of a piece of leather in a direction inward from the folded edge. Fig. 13 shows a perspective view of a cement-receptacle and devices connected therewith, whereupon a specific or proper amount of cement is in practice automatically taken out of said cement-receptacle. As certain parts by which cement is automatically deposited upon a device for rubbing the cement upon the skived part of the leather after the cement is automatically taken out of said cement-receptacle are obscured by many lines in Fig. 1, a detail plan of said parts is shown in Fig. 14 free from obscuring lines, in order that a comprehensive idea may be conveyed as to their construction and operation. Fig. 15 is a sectional detail, in side elevation, free from obscuring lines, to more fully illustrate the parts shown in Figs. 3, 1, and 14. Fig. 16 shows an end elevation of some of the parts shown in detail in Figs. 14 and 15 and also illustrates more fully than other views how that a cover for covering the device for rubbing the cement upon the leather is secured to the frame of the machine. Fig. 17 is a sectional detail view in elevation to illustrate the construction of a brush or device for depositing the cement upon the device for rubbing it upon the skived part of the leather.

In the journal-bearings of the knife-shaft support $A^{22}$, (shown in Figs. 1, 2, and 3,) rigidly but adjustably secured to the frame $A^{3}$, as and for the purpose hereinafter described, the rotatory disk skiving-knife shaft $A^{20}$ (shown in Figs. 3 and 2) is journaled. The horizontal grooved wheel $A^{21}$ (shown in Figs. 3 and 2) is secured upon said rotatory disk skiving-knife shaft $A^{20}$. A round belt (not shown) operating in practice in the groove of the wheel $A^{21}$ rotates said wheel $A^{21}$, the rotatory disk skiving-knife shaft $A^{20}$, secured thereto, and the rotatory disk skiving-knife $A^{17}$, secured to said shaft, with great rapidity. Attention is called to the fact that the power conveyed by this belt is exclusively applied to said wheel, knife-shaft, and knife, or, in other words, the knife-shaft is thereby operated independent of the means for conveying power to other parts of the machine. Said wheel, knife-shaft, and knife are rotated independent of the power conveyed to the other parts of the machine, which comprise devices whereupon feeding, cementing, slitting, folding, heating, and rubbing are accomplished in order that it may be possible to raise the speed of the wheel $A^{21}$, knife-shaft $A^{20}$, and knife $A^{17}$ to any desired speed from its normal speed to facilitate the skiving of some kinds of leather properly without affecting the speed of the rest of the operative devices of the machine, and a construction whereupon this could be accomplished not having been heretofore made the combination of means for rotating the knife-shaft and skiving-knife independent of the power conveyed to other operative parts of a skiving-machine in combination with the other operative parts of a skiving-machine in order that the speed of the knife may be raised without affecting the speed of the other operative parts of the machine is of my invention.

On the left-hand side of the frame or box $A^2$, (shown in section in Fig. 3,) which box incloses the greater part of the operative mechanism of the machine, is the bracket $A'$, secured to the frame or box $A^2$ on the outside of the frame or box by two screws, one above the other, and said bracket extends toward the left at right angles to the frame or box $A^2$ outside of the frame. This bracket is peculiar in shape, the lower end thereof being the journal-bearing shown inside of the frame or box $A^2$ near the left-hand lower corner of Fig. 3, in which journal-bearing the shaft A is journaled, and the upper end of said bracket being the journal-bearing directly above the first-named journal-bearing, also inside of the frame or box $A^2$, in which last-named journal-bearing the shaft A is also journaled. Upon the top of the shaft A above the last-named journal-bearing the device $A^4$ for folding and rubbing the skived part of the leather is rigidly secured and is rotated in practice with said shaft. This device $A^4$ is shaped like a disk and is beveled, as is shown in Fig. 9, in which figure the device $A^4$ is shown in vertical section. Attention is called to the left-hand side of Fig. 1 to the outer circular line which describes the circumference of said device $A^4$ in order that a comprehensive idea of the size of this device may be conveyed. Attention is also called to the left-hand upper corner of Fig. 2, at which place in said figure the device $A^4$ (shown in elevation) is not obscured by lines, and attention is also called to the right-hand lower corner of Fig. 14, where the device $A^4$ is shown in plan, free from obscuring lines, and attention is also called to the right-hand upper corner of Fig. 15, in which figure the device $A^4$ is shown in section and is also shown secured to a part of the shaft A. Attention is again called to the left-hand side of Fig. 3, where the horizontal grooved wheel $A^3$ is shown secured to the shaft A. A round belt (not shown) operating in practice in the groove of said wheel $A^3$ rotates said wheel $A^3$, the shaft A, shown secured thereto, and the device $A^4$, shown secured to said shaft and for folding and rubbing the skived part of a piece of leather, and to which device attention has been called in the several views.

Upon the shaft A, inside of the frame or box $A^2$ at the left-hand lower corner of said frame, the eccentric or cam $A^5$ is shown rigidly secured to the shaft A, which eccentric or cam is rotated by the shaft A when the shaft A is rotated. Immediately above said eccentric or cam $A^5$ is shown the coil-spring $A^9$, one end of which is secured to a screw shown fast in the bracket $A'$ and the other end of which is secured to a screw shown fast in the sleeve $A^{12}$, which sleeve is shown fast to the rod $A^6$, which sleeve and rod are shown in detail in Fig. 10, shown below Fig. 3, and as said rod $A^6$ is movably supported in the slideways $A^7$ and $A^8$, fast to the lower part of the frame $A^2$, the coil-spring $A^9$ moves said rod in practice and forces the left-hand end of said rod (shown also in Fig. 10) against the cam or eccentric $A^5$. Therefore it is plain that the rod $A^6$ is moved in practice toward the right in the slideways $A^7$ and $A^8$ against the stress of the spring $A^9$ by the eccentric or cam $A^5$ when the eccentric $A^5$ is rotated by the upright shaft A and is moved in practice toward the left by the force of the spring $A^9$, which spring $A^9$ moves said rod $A^6$, and thereby forces the left-hand end of said rod to follow the face of the eccentric or cam $A^5$, the cam and spring imparting a vibratory motion to said rod and the sleeve $A^{12}$ secured thereto. The distance that the rod $A^6$ is vibrated may be governed by manually adjusting the check-nuts $A^{10}$ and $A^{11}$ on the right-hand end of said rod and outside of the frame $A^2$, or, in other words, manually moving and securing them in a position nearer the frame or box $A^2$ shown in section near to said check-nuts, thereby preventing said coil-spring $A^9$ from moving the rod $A^6$ any farther than the distance between the frame and said check-nuts, thereby preventing the left-hand end of said rod from following the face of said cam throughout the movement of said cam, and thereby not allowing the cam $A^5$ to move said rod $A^6$ the full extent of the throw of the cam. The material or leather is moved in practice intermittently or step by step to the skiving-knife and the folding and rubbing device, as and on account of devices hereinafter described operated by power conveyed through said rod $A^6$. Therefore it is plain that said material or leather to be skived may be caused to be moved intermittently a greater or less distance by adjusting said check-nuts upon said rod $A^6$, as hereinabove described. The construction and assembling of all of the devices whereupon the feeding is accomplished except said rod $A^6$ and said means whereupon said rod is moved in practice, as aforesaid, are described as follows: The feeding device $A^{16}$ (shown in Fig. 4, which figure is shown below Fig. 1) is movably supported in practice between the prongs of the device $A^{27}$, (shown in Fig. 5, which figure is shown at the right of Fig. 4,) the pin $A^{26}$ (shown in the right-hand upper corner of Fig. 3) being inserted in the holes shown in the prongs of the device $A^{27}$ and extending through the hole in the center of the feeding device $A^{16}$, said pin fitting loosely in the hole in said feeding device $A^{16}$ in the manner shown in Fig. 3. The right-hand round part of the device $A^{27}$ is inserted in the hole in the sleeve $A^{28}$, as shown in Figs. 1 and 3, said round part fitting loosely in said hole, which sleeve $A^{28}$ is shown near to the end of the device $A^{27}$, and the device $A^{30}$ (shown in Fig. 7 at the right of the device $A^{28}$) is secured upon the round part of the device $A^{27}$ by the screw $A^{31}$, (shown in the device $A^{30}$,) as shown in Figs. 1 and 3, said device $A^{30}$ having the function of a collar and having a handle thereon, and the trunnions $A^{32}$ and $A^{33}$ of the sleeve $A^{28}$ are placed in the round holes shown in the bracket $A^{34}$, which bracket is made fast to the frame $A^2$ on the outside of the frame, the part $A^{27}$ (shown in Fig. 5 below Fig. 1) and the feeding device $A^{16}$, movably secured to said part, extending through the frame $A^2$ on the inside of the frame $A^2$, as shown in the right-hand upper corner of Fig. 3.

It will be observed by the description of the assembling of the parts whereupon the feeding is accomplished that the trunnions $A^{32}$ and $A^{33}$ of the sleeve $A^{28}$, movably supported in the round holes shown in the bracket $A^{34}$, (shown in Fig. 8,) form a construction whereupon the feeding device $A^{16}$ (shown in Figs. 3 and 1) may be moved up and down. In order to prevent this feeding device $A^{16}$ (shown in the right-hand upper corner of Fig. 3) from falling and turning, the trunnions $A^{32}$ and $A^{33}$ (shown in Fig. 6 under Fig. 1) in the round holes in the bracket $A^{34}$, (shown in Fig. 8,) in which they are pivoted, as shown in Fig. 3, and that the feeding device $A^{16}$ may be yieldingly supported, the spring $A^{44}$ is devised. The spring $A^{44}$ is secured to the part $A^{40}$, which part $A^{40}$ is pivoted by the screw $A^{41}$ to the bracket $A^{39}$, which screw $A^{41}$ fits loosely in a hole in said part $A^{40}$ and is firmly secured into the bracket $A^{39}$ which bracket is fastened to the outside of the frame $A^2$ by the screw $A^{42}$, said bracket extending through the frame $A^2$, and said spring $A^{44}$ bears against the device $A^{27}$, in which the feeding device $A^{16}$ is movably secured, and the screw $A^{43}$ is threaded in the frame $A^2$ and forced against the part $A^{40}$, exerting force upon the spring $A^{44}$, thereby causing said spring to hold the feeding device $A^{16}$ in the position in which it is shown, and the screw $A^{43}$ is secured in position by the check-nut thereon. The spring $A^{44}$ is prevented from forcing the feeding device $A^{16}$ too high by the screw $A^{45}$, threaded in the right-hand upper corner of the frame $A^2$ and extending down vertically and bearing against the device $A^{27}$, by which device $A^{27}$ the feeding device $A^{16}$ is movably supported. Therefore it is plain that on account of the devices described and the spring $A^{44}$, whereupon the feeding device $A^{16}$ is held upward, the feeding device $A^{16}$ is yieldingly supported, or, in other words, it may be pushed downward, causing the spring $A^{44}$ to yield, which spring exerts force, whereupon the feeding device $A^{16}$ is normally held in its proper elevation or in the elevation in which it is shown. It is also plain that the device $A^{27}$ may be manually turned or adjusted in the hole in the sleeve $A^{28}$ by the handle of the device $A^{30}$ (shown in Figs. 7, 3, and 1) and secured by the screw $A^{29}$ in the sleeve $A^{28}$, (shown in Figs. 6, 3, 2, and 1,) thereby adjusting the feeding device $A^{16}$, movably supported in the device $A^{27}$, as hereinabove described and as shown in Figs. 5, 3, and 1, out of a vertical position and at any necessary angle to the cutting edge of the rotatory disk skiving-knife $A^{17}$, as shown in Figs. 2, 3, and 1.

Attention is called to the flange upon the feeding device $A^{16}$, (shown in detail in Fig. 4 under Fig. 1,) which flange extends out from the nearest side of said feeding device. Attention is also called to this flange in Fig. 2 on the left-hand side of said feeding device. Attention is again called to this flange in Fig. 3. The upper end of the lever $A^{15}$ is grooved and fits upon the flange of the feeding device $A^{16}$, but may be moved or slipped upon said flange. Fast to the upper end of the lever $A^{15}$ is a hook, to which one end of the coil-spring $A^{18}$ is shown secured, the other end of the coil-spring $A^{18}$ being shown secured to a screw shown in the support $A^{19}$, shown secured to the bracket $A'$, which spring is shown expanded or stretched beyond its normal length, exerting force upon the lever $A^{15}$. The lower end of the lever $A^{15}$ is shown forked and fitted upon the roll $A^{14}$, which roll is shown movably secured upon the stud $A^{13}$ (shown also in detail in Fig. 10 under Fig. 3) and is prevented from coming off of said stud by the hexagon nut shown on said screw in Fig. 3. When the rod $A^6$ (shown at the bottom of Fig. 3 and in detail in Fig. 10) is moved toward the right in practice by the cam $A^5$, as hereinabove described, thereby carrying the roll $A^{14}$, the lever $A^{15}$, shown connected with said roll, is moved toward the right by said roll, and the flange of the feeding device $A^{16}$ is gripped by said lever and the lower part of said feeding device is carried toward the right, and the upper part of said feeding device is thereby carried toward the left in order to move the leather toward the left or toward the rotatory disk skiving-knife $A^{17}$ and the folding and rubbing device $A^4$, and the coil-spring $A^{18}$, shown secured to the hook shown in the lever $A^{15}$ and to the screw shown in the bracket $A^{19}$, is expanded or stretched beyond its normal length, and the spring $A^9$, shown in Fig. 3 secured to the screw shown in the sleeve $A^{12}$ shown on the rod $A^6$ and shown secured to the screw shown in the bracket $A'$, is also expanded, which spring $A^9$ moves the rod $A^6$ toward the left in practice, the cam $A^5$ permitting thereby moving the lower end of the lever $A^{15}$ toward the left, allowing the spring $A^{18}$, shown secured to the hook in the lever $A^{15}$, to move or slip the lever $A^{15}$ toward the left upon the flange of the feeding device $A^{16}$, while the feeding device $A^{16}$ is prevented from being moved by this movement by the cylindrical chock or "trig" $A^{46}$, forced down in the V-shaped opening (shown in Fig. 3 by dotted lines) between the face of the feeding device $A^{16}$ and the back of the slot in the device $A^{27}$ (shown also by dotted lines) by the spring $A^{47}$, shown secured to the device $A^{27}$ by the screw $A^{48}$.

In Fig. 2 the bottom part of the presser-foot B is shown above the feeding device $A^{16}$ and near thereto. The screw having the hexagon head shown in front of the presser-foot B is inserted in a slot shown by dotted lines in the presser-foot under the hexagon head and is threaded in another piece in the manner shown in Fig. 3, clamping the presser-foot B to the other piece by said screw, as is shown in Fig. 3, and leaving the presser-foot adjustable to the right and left on the piece to which it is secured, as is plain by this construction in Fig. 2. The piece to which the presser-foot B is thus secured thereby becomes a part of the presser-foot B. This part to which the presser-foot B is thus secured is movably secured to the arm $B^{22}$ (shown in Figs. 2 and 3) by the two screws shown in Fig. 2 immediately above the hexagon screw, which screws extend through the slot in the upper part of the presser-foot B (shown by the dotted lines under the round heads of said screws) and are threaded in the arm $B^{22}$, which is rigidly secured to the frame $A^2$, affording an adjustment of the presser-foot up and down. Therefore it is plain by the devices shown in Fig. 2 and the description thereof that this presser-foot is rigidly secured, but is manually adjustable toward the right and left and is also adjustable up and down.

The presser-bar $B^{21}$ is shown in Figs. 1, 2, and 3 movably secured in the arm $B^{22}$. Upon the presser-bar $B^{21}$, between the bearings in which it is movably secured, a collar is shown rigidly secured to said presser-bar $B^{21}$. Resting upon this collar the end of the long flat spring $B^{23}$ is shown, which spring presses the presser-bar $B^{21}$ downward with great force as far as the knurled nut on the top of the presser-bar $B^{21}$ permits. Said flat spring $B^{23}$ is secured to the arm $B^{21}$ by the first screw (shown by dotted lines in Fig. 2) at the left from the screw $B^{10}$ in the arm $B^{22}$, and said flat spring is forced down upon the collar of the presser-bar $B^{21}$, thereby forcing the presser-bar downward by the second screw at the left from the screw $B^{10}$ in the arm $B^{22}$, (shown also by dotted lines in Fig. 2,) which screw is shown knurled in Fig. 3 and extends through a slot in the spring $B^{23}$ and is threaded into the frame $A^2$, by which screw the amount of pressure upon the presser-bar $B^{21}$ may be manually governed. Upon the bottom of the presser-bar $B^{21}$ the presser $B^{20}$ is shown in Figs. 2 and 3 rigidly secured, which presser $B^{20}$ is normally held and yieldingly supported at such an elevation above the device $A^4$ on account of the above-described devices that the skived part of the leather before it is folded may be moved under the presser $B^{20}$ without binding the leather; but the folded part of the leather being thicker than the skived part of the leather is forced against said presser $B^{20}$ in practice and rubbed by the highest portion of the operative part of the device $A^4$ at proper times. When the feeding device $A^{16}$ is moved in practice intermittently or little by little, as hereinabove described, the part of leather near the edge of the leather is thereby moved intermittently between the presser-foot B and the feeding device $A^{16}$ and is moved intermittently against the cutting edge of the rotatory disk skiving-knife $A^{17}$ at an angle to said cutting edge of said rotatory disk skiving-knife by said feeding device, and said leather is skived by said skiving-knife little by little near the edge of said leather and shaped like a wedge on account of the intermittent movement imparted to the leather by said feeding device and is intermittently moved up on the device $A^4$ for folding and rubbing the skived part of the leather, the body of the leather being toward the left, and the skived part is slit and folded, as and by devices hereinafter described, as it is thus passing, and the shaving cut from said leather as it is thus passing falls upon a sheet-iron chute of common construction, which chute is secured to the frame $A^2$ and is adapted to prevent the shavings from getting into the operative mechanism of the machine. The position of one side of this chute is indicated at the left-hand side of Fig. 1 by a dotted line outside of the frame $A^2$ near to said frame and extending parallel with said frame, said dotted line passing through the heating device $D^{14}$, and the other two sides of said chute are indicated by two dotted lines very near together. This chute is also shown in other figures; but no reference character is placed thereon, because reference to the chute is not considered necessary, as nothing new is claimed in the construction thereof and because the chute is not a part of the operative mechanism whereupon the unitary result of the invention is accomplished, the use of said chute being wholly to prevent the shavings from falling into the operative mechanism of the machine.

Having shown and described the mechanism comprising the rotatory disk skiving-knife $A^{17}$ and the feeding device $A^{16}$ yieldingly supported and the means whereupon the feeding device $A^{16}$ is automatically moved intermittently little by little in order to move the leather little by little intermittently against the cutting edge of said rotatory disk skiving-knife $A^{17}$ and having also described the general shape and construction of the device $A^4$ for folding the skived part of the leather and for rubbing the folded part of the leather from the folded edge inward and set forth the operation of the feeding device $A^{16}$ and the rotatory disk skiving-knife $A^{17}$ and set forth the result accomplished on account of said skiving-knife and feeding device, attention is called to the specific construction and novel features of the device whereupon the skived part of the leather is folded and rubbed from the folded edge of the leather inward. In Fig. 3 this device $A^4$ is shown in side elevation. In Fig. 1 the device $A^4$ is shown in plan and is inclosed by the largest circular line in the view. The next to the largest circular line indicates the top of the bevel. (Shown in side elevation in Fig. 3.) Attention is particularly called to this bevel, the device itself being made thick for strength and beveled like a wedge. It should be fully understood that, as it is hereinabove described, this device $A^4$ is rotatable and that the direction of its movement is from the skived edge of the leather inward at about right angles to said skived edge, and it should be fully realized that this device $A^4$, made thick for strength and beveled for utility and recessed as and for the purpose hereinafter described and adapted to be rotated and moved from the skived edge inward, is regarded as the chief device of this invention. In actual construction the operative part of the device $A^4$, (shown in Figs. 1, 2, 3, and 15,) or, in other words, that part of the device $A^4$ which contributes in the production of the folded edge by acting upon the leather, is designed to be irregular, or, in other words, some portions of the operative part of the device $A^4$ are designed to be higher than other portions of said operative part. The operative part of the device $A^4$ is shown recessed clear through the device $A^4$ from the inclined portion $B^{19}$ of the operative part of the device $A^4$ to the inclined portion of the operative part of the device $A^4$, (indicated by the first reference character Z at the left of the reference character $B^{19}$,) because the recess shown as extending clear through the device $A^4$ shows the operativeness of the invention better than it would if it were shown as not extending clear through the device $A^4$, and besides this recess another portion of said operative part of the device $A^4$ is shown recessed from the inclined portion indicated by the reference character Z to the inclined portion thereof indicated by the second reference character Z near thereto, which recess Z Z is not shown as extending clear through the device $A^4$. Therefore it is shown by Figs. 1, 2, 3, and 15 that said operative part of the device $A^4$ is recessed at various places to various depths and also that said operative part of the device $A^4$ comprises a surface some parts of which are higher than other parts. This device is not only a folding and rubbing device, but it is also a cementing device, or, in other words, a device for depositing cement upon the skived surface of the leather before it is folded, as will hereinafter appear. Upon the horizontal part of the recessed portion Z Z of the operative part of the device $A^4$ cement is mechanically deposited in practice as and by devices hereinafter described and is deposited upon the skived surface of the leather before it is folded in practice by said recessed portion Z Z as and by devices hereinafter described. The reason why the portion Z Z of the operative part of the device $A^4$ is made lower than other portions of said operative part is that if it were not so the cement would be distributed over the surface of the highest portion of the operative part of the folding and rubbing device $A^4$, or, in other words, upon that part which rubs the folded part of the leather after it is folded, and this is undesirable; but on account of the portion Z Z of the operative part of the device $A^4$, upon which cement is deposited in practice as and by devices hereinafter described, being made lower than other portions of the operative part of the folding and rubbing device $A^4$ cement is deposited in practice upon the skived surface of the leather by said recessed portion Z Z of the operative part of the device $A^4$ before the skived part of the leather is folded, thereby enabling the highest portion of said operative part of said folding and rubbing device $A^4$ to rub in practice the opposite side of the leather from the side on which cement is deposited, thereby preventing cement from being distributed upon said highest portion. Therefore the operative part of the device $A^4$, comprising recessed portions and a surface some parts of which are higher than other parts, is a distinct novel feature of this invention.

Having shown and described that the device $A^4$ for folding and rubbing the skived part of the leather is also a cementing device for depositing cement upon the skived part of the leather before it is folded and stated that cement is deposited in practice upon a recessed portion of the operative part of the device $A^4$ for folding and rubbing the skived part of the leather, as and by devices hereinafter described, and that cement is rubbed in practice by said cementing device upon the skived part of the leather, attention is called to the description of the receptacle in which cement is kept and the devices whereupon cement is automatically taken in practice from said cement-receptacle and deposited upon said recessed portion of said operative part of said device $A^4$. The cement-receptacle C (shown in detail in Fig. 13) is in practice manually filled with cement. Two projections or legs are shown upon the front side of said receptacle, and a round hole is shown through each projection or leg. Said cement-receptacle C is secured to the frame $A^2$, as shown in Figs. 1 and 3, by screws (shown by dotted lines) extending through said holes in said projections or legs and threaded into the frame $A^2$, and said receptacle is also shown secured to the bracket A′ by two flat-head screws (shown at the extreme left in Fig. 3) extending through the bracket A′ and threaded into the bottom of said receptacle. The shaft C′ is shown journaled in said cement-receptacle and extends through said cement. Fast upon said shaft is the cement-wheel $C^2$, shown projecting above the top of the cover of said receptacle. Movably secured to said shaft C′ is shown the pawl-carrier $C^3$. A spring $C^4$ is shown fast to said receptacle and bears against said pawl-carrier $C^3$ and normally forces said pawl-carrier $C^3$ against the screw $C^5$, shown fast in said receptacle.) Fast in said pawl-carrier $C^3$ is shown a piece of rawhide $C^6$. The pawl $C^7$ is loose upon the screw $C^8$, which screw is shown fast in said pawl-carrier. The end of the pawl $C^7$ is shown held in contact with the ratchet $C^9$ by the spring $C^{10}$, shown fast to the screw $C^{11}$, shown in said pawl, and the screw $C^{12}$, shown in said pawl-carrier, and said ratchet is shown secured to the shaft C′. A device or striker $C^{13}$ is shown in Figs. 9 and 1 secured to and adapted to be carried by said device $A^4$. It is plain by Fig. 9, in which a section of said device $A^4$ is shown, that the device or striker $C^{13}$ is carried by the device $A^4$ into contact with the rawhide $C^6$, (shown in Fig. 13,) fast in said pawl-carrier $C^3$ every time said device $A^4$ is rotated. It will be observed that said pawl-carrier is thereby moved a short distance in one direction by said device or striker every time the rawhide $C^6$, fast in said pawl-carrier, is struck thereby, thereby forcing the pawl $C^7$, carried by said pawl-carrier $C^3$, to engage and turn the ratchet $C^9$, the shaft C′, secured thereto, and the cement-wheel $C^2$, fast to said shaft, intermittently or little by little, thereby taking cement out of said receptacle on the face of said cement-wheel $C^2$ at every revolution of the device $A^4$, the spring $C^4$ moving the pawl-carrier $C^3$ in the opposite direction from the direction in which it is moved by the striker $C^{13}$ every time it is moved by the device or striker $C^{13}$. After cement is in practice thus automatically taken out of said receptacle upon the face of said cement-wheel $C^2$ the cement is mechanically taken from said cement-wheel and is mechanically deposited upon the recessed portion Z Z of the operative part of said device $A^4$ for rubbing cement upon the skived surface of the leather, which portion Z Z is in practice passing by said cement-wheel at about the same time that cement is taken out of said receptacle on account of devices described as follows: The device $A^4$ is shown in Figs. 1, 2, 3, 14, and 15. The cam $C^{17}$ is shown upon the top of said device $A^4$, secured to said device $A^4$. Said cam $C^{17}$ is covered with a cover $C^{18}$. (Shown in Figs. 2, 3, 14, 15, and 16.) Said cover $C^{18}$ is shown secured to the bracket $C^{19}$ by the screws $C^{20}$ and $C^{21}$. (Shown in the upper part of Figs. 1 and 14 and also near the left-hand upper corner of Fig. 3.) Said cover $C^{18}$ is also shown secured to the brackets $C^{22}$ and $C^{23}$ by the screws $C^{24}$, $C^{25}$, $C^{26}$, and $C^{27}$, as shown in Figs. 1, 14, and 16. These brackets are secured to the cement-receptacle C, as is plain by Figs. 1, 14, and 16. There is a part $C^{28}$ (shown in Fig. 2) fast to said cover $C^{18}$ that extends toward the right. Said part is shown fast upon the frame $A^2$. Thus it is plain that said cover $C^{18}$ is supported at four different places. Every time that said device $A^4$ is rotated said cam $C^{17}$, (shown in Figs. 1, 2, 3, 14, and 15,) fast to said device $A^4$, is rotated. The cement-brush bar $C^{29}$, shown mounted in the ways $C^{30}$ and $C^{31}$, (shown in Figs. 1, 3, 14, 15, and 16,) is shown held against the cam $C^{17}$ by the coil-spring $C^{32}$, shown fast to a pin $C^{33}$, shown in said cement-brush bar, and to a pin $C^{34}$, shown fast in said cover $C^{18}$. Therefore it is plain that said cement-brush bar $C^{29}$ is moved in practice in one direction by said cam $C^{17}$ and in the opposite direction by said coil-spring $C^{32}$. In Figs. 1, 3, 14, and 15 the cement-brush $C^{35}$ is shown bearing upon the cement-wheel $C^2$ in the position it is in practice taking cement from said cement-wheel. It is plain by the shape of said cam $C^{17}$ (shown in Fig. 1) that said cement-brush is moved in practice from the position shown in said figures to the recessed portion Z Z of the operative part of said device $A^4$, hereinabove described, which recessed portion Z Z is shown in Figs. 1 and 15, and that cement is taken in practice from said cement-wheel $C^2$ by said cement-brush $C^{35}$ and deposited upon said recessed portion Z Z of said operative part of said device $A^4$. The construction of the cement-brush $C^{35}$ is shown in Fig. 17. Said brush is made of bristles by pulling them double into the hole in said brush-bar by the wire $C^{36}$, and the end of the wire $C^{36}$ is secured by the screw $C^{37}$, thereby securing the bristles in said brush-bar; but the device for taking cement off from said cement-wheel $C^2$ is not restricted to this form, but may be any device suitable for the purpose for which this brush is used. I believe that such devices have not been heretofore devised whereupon cement taken out from a cement-receptacle is then taken and deposited upon the skived surface of a piece of leather and I also believe that such means have not been combined with operative parts of skiving-machines or skiving and folding machines and have not heretofore contributed in the production of a folded edge, and therefore I believe that the devices employed in this machine, whereupon cement is taken from said cement-wheel and deposited upon the skived surface of the leather, form a novel combination of devices comprised in this invention, which combination contributes to the production of the unitary result of the machine—viz., a folded edge.

The thumb-screw $C^{38}$ (shown at the left-hand lower corner of Fig. 3 and shown also in Fig. 1) extends through a hole in the frame $A^2$, fitting loosely in said hole, the head of said screw bearing against the outer side of said frame and a collar fast to said screw bearing against the inner side of said frame, said screw being also threaded into the bottom of the adjustable knife-shaft support $A^{22}$, (shown in Figs. 1 and 2,) which adjustable knife-shaft support comprises the two journal-bearings in which the skiving-knife $A^{20}$ is rotatably secured. Said adjustable knife-support is held firmly upon the bottom of the frame $A^2$ by the hand-screw $C^{39}$, (shown in Figs. 1 and 2,) which hand-screw is shown threaded upon a screw, (shown in Figs. 1 and 2,) which screw extends through a hole in the bottom of the frame $A^2$ and through a slot (shown in Fig. 1) in said adjustable knife-shaft support, and when said rotatory disk skiving-knife $A^{17}$ is worn so small that the cutting edge thereof is not in the proper relative position with the edge of the operative part of the device $A^4$ the adjustable knife-shaft support $A^{22}$ may be loosened on the frame $A^2$ by said hand-screw, and the knife-shaft support, with the knife-shaft $A^{20}$ mounted therein, and the rotatory disk skiving-knife $A^{17}$, secured to said shaft, may be manually forced forward in practice by said thumb-screw $C^{38}$ until the cutting edge of said skiving-knife $A^{17}$ is in the proper position, and then said knife-shaft support $A^{22}$ may be again firmly fixed or secured to the frame $A^2$ by said hand-screw. It should be understood that the means whereupon said skiving-knife may be thus moved into position after it is worn so small that it is out of proper relative position with the edge of said operative part of said device $A^4$ for folding and rubbing is also a novel feature of this invention.

There are operative devices in this machine—viz., devices whereupon the slitting of the skived part of the leather at about right angles to the skived edge of the leather is accomplished—which contribute to the unitary result attained by the machine—viz., a folded edge—which devices have not been heretofore described; but as the nature of the entire combination of devices, or this machine, is such that a description of the operative devices referred would not be fully comprehensive except they be described in combination with other operative parts after due deliberation it has been deemed best that they be described in the operation of the machine, which is as follows: The leather is moved about one-eighth of an inch, in the manner hereinabove described, by the feeding device $A^{16}$, operated by devices hereinabove described against the skiving-knife $A^{17}$, and is thereby skived a short distance, or about one-eighth of an inch, and the device $A^4$ is so timed with the devices whereupon the feeding device is moved that the leather is moved in upon said recessed portion Z Z (shown in Figs. 1, 2, and 15) and the cam-surface $A^{25}$ on the wheel $A^3$ (shown in Fig. 3) is forced into contact with the roll $A^{23}$, (shown in Figs. 1 and 2,) which roll is movably secured to the screw $A^{24}$, which screw is fast in the lever B′, (shown in Figs. 1 and 2,) thereby moving the lever B′ fast to one end of the shaft $B^2$ and also shown in Fig. 1, thereby turning the shaft $B^2$ in the bracket $B^3$, (shown in Fig. 1,) which bracket is secured to the frame $A^2$, thereby moving the lever $B^4$, (shown in Fig. 2,) fast to the other end of the shaft $B^2$ and also shown in Fig. 1, the reference character thereon being near the pivotal point of the lever $B^8$ in Fig. 1, in such a manner as to move the link $B^5$, (shown in Fig. 2,) pivoted to the lever $B^4$ by the screw $B^6$, upward against the power of the spring $B^7$, secured to a screw in the arm $B^{22}$ and to a screw in the link $B^5$, and moving the right-hand end of the lever $B^8$, pivoted to the link $B^5$ by the screw $B^9$, upward upon the pivot $B^{10}$, fast in the arm $B^{22}$, thereby moving the left-hand end of the lever $B^8$ downward and carrying the link $B^{11}$, pivoted to the lever $B^8$ by the screw $B^{12}$, and the bracket $B^{13}$, pivoted to the link $B^{11}$ by the screw $B^{14}$, and the knife-bar $B^{15}$, movably secured to the arm $B^{22}$ and rigidly secured to the bracket $B^{13}$, downward, thereby carrying the bending device or spring $B^{18}$, shaped somewhat like the letter J and secured to the lower part of the knife-bar $B^{15}$, the lower end of which bending device is shown in Fig. 2 by dotted lines behind the knife $B^{16}$ downward, the thickness and width of the lower end of which bending device are shown by dotted lines in Fig. 3, thereby pressing the skived part of the leather down upon the recessed portion Z Z of the operative part of the device $A^4$, which bending device $B^{18}$ is thereby forced to yield or bend, and the knife $B^{16}$, (shown in Figs. 2 and 3,) the lower end of which knife is beveled like a chisel and sharp, which knife is fast to the lower end of the knife-bar $B^{15}$, is forced by said knife-bar down upon the skived part of the leather, one side and cutting edge of said knife shearing past and rubbing the shearing device or block $B^{17}$, rigidly secured to the frame $A^2$ and shown in Fig. 2, and the other side of said knife almost rubbing against the periphery of the moving device $A^4$, thereby cutting a slit about one-eighth of an inch long through the leather and at about right angles to the skived edge, thereby disconnecting the skived part from the part not skived, and the cement deposited upon said recessed portion Z Z of the operative part of the device $A^4$ as and by devices hereinabove described is rubbed upon the skived surface of the leather, and the recess or opening in the operative part of the device $A^4$, which device is being moved in the direction indicated by the arrow shown thereon, is mechanically carried under the part of the leather upon which the bending device $B^{18}$ is pressing, whereupon the skived and slit part of the leather is bent downward by the spring $B^{18}$ into said recess or opening and is instantly caught and folded under by the inclined portion $B^{19}$ and is rubbed in the direction from the folded edge inward by the highest portion of the operative part of the device $A^4$, which device is hot, being heated by the gas device $D^{14}$, as hereinafter described, said skived part of the leather being firmly but yieldingly held down upon the highest portion of the operative part of the device $A^4$, while the folded part is rubbed by the presser $B^{20}$, fast to the presser-bar $B^{21}$, (shown in Figs. 2 and 3,) which presser-bar is movably supported in the arm $B^{22}$ and firmly but yieldingly held down by the spring $B^{23}$, (shown in Figs. 1, 2, and 3,) secured to the arm $B^{22}$ by a slotted screw (shown by dotted lines in Fig. 2) at the left of the pivot-screw $B^{10}$ in the arm $B^{22}$, said spring $B^{23}$ being held downward upon a collar, shown secured to the presser-bar $B^{21}$ in Figs. 2 and 3, by a thumb-screw, (shown by dotted lines in Fig. 2 at the left of said slotted screw,) said thumb-screw extending through a slot in said spring and threaded into the arm $B^{22}$.

Repetitions of the above-described operation produce a folded edge of a piece of leather that may be thicker, but substantially the same thickness as the leather before it is folded.

Let it be understood that a machine comprising devices whereupon the leather may be moved and skived, a device whereupon said leather may be split at its edge, a cement-receptacle and means whereupon a proper amount of cement may be taken therefrom and put upon the leather, and means whereupon said leather may be folded and pressed, all devised so that it is possible for them to operate in such proximity on the leather that a folded edge may be produced thereon around short curves, originated wholly with me, and therefore I claim the novel combinations of these devices regardless of how the devices are made.

In order that all the cement that is placed upon the recessed portion Z Z of the operative part of the device $A^4$ may be used upon the leather every time said cement is put in practice upon the recessed portion Z Z, as described, the device $C^{14}$ is devised. The device $C^{14}$, shown movably secured to the cover of said receptacle C by the screw $C^{15}$ extending through the slot shown in said device $C^{14}$ and threaded into the cover of said receptacle, which device $C^{14}$ is also movably connected with the thumb-screw $C^{16}$, which extends through and fits loosely in a hole in the device $C^{14}$, the body of the thumb-screw bearing against one side of the device $C^{14}$, as shown in Fig. 13, and a collar, (shown in Fig. 1,) fast to said thumb-screw, bearing against the other side of the device $C^{14}$, may be moved toward or from the cement-wheel $C^2$ by the thumb-screw $C^{16}$, thereby placing the chisel-shaped end of the device $C^{14}$ at a proper distance from the cement-wheel $C^2$ to allow the cement-wheel $C^2$ to take a specific amount of cement out of the receptacle C, or, in other words, to allow said cement-wheel $C^2$ to take cement out of said receptacle just as fast as it is needed upon the leather, whereupon the accumulation of cement upon the recessed portion Z Z of the operative part of the device $A^4$ is prevented. It will be observed that this cement-receptacle is so made that it is nearly air-tight in order that the liquid in the cement therein may not evaporate.

It is plain that before the unitary result of this machine—viz., a folded edge—can be produced said skiving-knife $A^{17}$ must be ground or sharpened. Therefore the mechanism whereupon said skiving-knife may be mechanically ground or sharpened is a component part of the machine which is the subject of the present application and is shown in the drawings, and is described as follows: In Figs. 2 and 1 the upright shaft D is shown journaled in the bearings D′ and $D^2$, which bearings are shown fast to the frame $A^2$. Shown fast to said shaft D is the emery-wheel-shaft support $D^4$, having a handle near which the reference character $D^4$ is placed, said emery-wheel-shaft support $D^4$ also having two arms, the upper one of which is designated in Figs. 1 and 2 by the reference character $D^3$, and each one of these arms supports a journal-bearing. (Shown in Fig. 2.) The emery-wheel shaft $D^5$ is shown journaled in said journal-bearings of said emery-wheel-shaft support. In said shaft is shown the groove $D^6$. Upon said shaft is shown the friction-wheel $D^7$. The screw $D^8$ is shown screwed tightly into said friction-wheel, and the point of said screw fits loosely in said groove $D^6$ in said emery-wheel shaft $D^5$. Therefore it is plain that the friction-wheel $D^7$ is rotated in practice with said shaft, but is movable vertically upon said shaft. Above said friction-wheel $D^7$ and bearing against said friction-wheel and around said shaft $D^5$ is shown the coil-spring $D^9$, the end of which enters into the collar shown upon the shaft $D^5$ above said spring, which collar is shown secured to the shaft $D^5$ by a screw, and on the top of said emery-wheel shaft $D^5$ the emery-wheel $D^{11}$ is secured, as shown in Fig. 2. In Fig. 11 said friction-wheel $D^7$ is shown in detail, and a ring of rawhide $D^{10}$ is shown secured upon the inclined part of said friction-wheel. The grinding of said skiving-knife $A^{17}$ may be accomplished by the emery-wheel $D^{11}$, shown fast to said shaft $D^5$, as follows: The handle of said emery-wheel-shaft support $D^4$ (shown in Figs. 1 and 2) may be moved in practice by hand, thereby moving the shaft D, (shown in Figs. 2 and 1,) secured to said emery-wheel-shaft support $D^4$ and mounted in the journal-bearings $D'$ and $D^2$, the emery-wheel shaft $D^5$, shown rotatably secured in the journal-bearings of said emery-wheel-shaft support, and all the devices shown secured to said emery-wheel shaft, thereby forcing the inclined rawhide surface $D^{10}$ (shown in Fig. 11) of the friction-wheel $D^7$ (shown also in Figs. 2 and 1) into contact with the inclined surface of the friction-wheel $D^{12}$, (shown in Fig. 3 and shown also in Fig. 2,) secured by a screw to the skiving-knife shaft $A^{20}$, which friction-wheel is rapidly rotated by the skiving-knife shaft $A^{20}$, to which said skiving-knife $A^{17}$ is secured, and thereby forcing the emery-wheel $D^{11}$, secured upon the top end of said emery-wheel shaft $D^5$, against the skiving-knife $A^{17}$, near its cutting edge, and thereby forcing the friction-wheel $D^7$ upward upon the emery-wheel shaft $D^5$ against the force of the coil-spring $D^9$, whereupon the friction-wheel $D^7$, the emery-wheel shaft $D^5$, and the emery-wheel $D^{11}$ are rotated, thereby grinding said skiving-knife. After said skiving-knife is ground sharp the handle $D^4$ should be released, thereby allowing the coil-spring $D^{13}$, (shown by dotted lines near the right-hand lower corner of Fig. 1,) secured to the emery-wheel-shaft support $D^4$ and to the inside of the frame $A^2$, a part of which spring is also shown in Fig. 2, to pull the emery-wheel-shaft support $D^4$, the emery-wheel shaft $D^5$, and all the devices secured to said emery-wheel shaft back in the opposite direction from that in which they are moved by hand and to thereby cause the grinding to immediately cease.

The device $A^4$ (shown in Figs. 1, 2, and 3) is heated in practice by the gas device $D^{14}$. (Shown in Figs. 1, 2, and 12.) The construction of this gas device is shown in detail in Fig. 12. The tube $D^{15}$ is shown broken. If gas were applied directly from a gas jet or tip against the device $A^4$ and if it were lighted while thus applied, in a few minutes said device would be covered with lampblack from the smoke caused by the burning gas. To prevent the accumulation of lampblack, the gas device shown in Fig. 2 is employed. The draft of the lighted gas inside of the gas device draws air in at the holes $D^{16}$ and $D^{17}$ in the bottom of said device in practice, and a blue flame is thereby forced out of the top of said gas device through the hole $D^{18}$. This flame is practically free from smoke by which lampblack is accumulated, and therefore little or no lampblack is formed in practice. This gas-burner is not of my invention, but is practically the same as the heating device known as the "Bunsen burner." It is evident that other means for heating said device $A^4$ may be employed besides this gas device, and it is also evident that other combustibles may be used besides gas.

Having hereinabove described the accompanying drawings of a machine in which this invention is embodied and having carefully set forth the novel features and combinations of this invention, I claim as follows:

1. In a skiving and folding machine the following combination of instrumentalities, viz: a folding device; means for operating the same; a skiving device comprising a skiving-knife and means whereupon it may be actuated; a feeding device the corrugated part of which is at an angle to the cutting edge of said skiving-knife; a presser-foot near said feeding device; manually-adjustable means, whereupon, said angle may be changed, whereupon the leather may be skived at different angles; and means, whereupon, the feeding device is operated, said instrumentalities being organized in operative relation, and said skiving device being adapted to be operated independently of any other operative part of the machine.

2. In a skiving and folding machine the following combination of instrumentalities, viz: a folding device; means for operating the same; a skiving device comprising a skiving-knife and means whereupon it may be actuated; a feeding device the corrugated part of which is at an angle to the cutting edge of said skiving-knife; a rigid presser-foot secured near to said feeding device; manually-adjustable means by which said angle may be changed; means, whereupon the feeding device is yieldingly supported; and means, whereupon the feeding device may be actuated, said instrumentalities being organized in operative relation, and said skiving device being adapted to be actuated independently of any other operative part of the machine.

3. In a skiving and folding machine the following combination of instrumentalities, viz: a folding device; means for operating the same; a skiving device comprising a skiving-knife and means whereupon it may be actuated; a feeding device the corrugated part of which is at an angle to the cutting edge of said skiving-knife; a presser-foot secured near to said feeding device; manually-adjustable means, whereupon, said angle may be changed, to cause the leather to be skived at different angles; means, whereupon, the feeding device is operated; a slitting device whereupon slits are cut in the material at an angle to the edge of the material; and means, whereupon, the slitting device is operated, said instrumentalities being organized in operative relation, and said skiving device being adapted to be operated independently of any other operative part of the machine.

4. In a skiving and folding machine the following combination of instrumentalities, viz: a folding device; means for operating the same; a skiving device comprising a skiving-knife and means whereupon it may be actuated; a feeding device the corrugated part of which is at an angle to the cutting edge of said skiving-knife; a rigid presser-foot secured near to said feeding device; manually-adjustable means by which said angle may be changed; means, whereupon, said feeding device is yieldingly supported; means, whereupon, the feeding device may be actuated; a slitting device whereupon slits are cut in the material at an angle to the edge of the material; and means, whereupon, the slitting device is operated, said instrumentalities being organized in operative relation, and said skiving device being adapted to be operated independently of any other operative part of the machine.

5. In a skiving and folding machine the following combination of instrumentalities, viz: a skiving device; a feeding device; a slitting device; a bending device; a cementing device; a folding and rubbing device; a pressing device; and suitable means whereupon they may be actuated; said instrumentalities being organized in operative relation, and the skiving device being adapted to be actuated independently of any other operative part of the machine.

6. In a skiving and folding machine the following combination of instrumentalities, viz: a folding mechanism; a skiving device; a feeding device; a cementing device; and means whereupon they may be actuated; said instrumentalities being organized in operative relation, and the skiving device being adapted to be actuated independently of any other operative part of the machine.

7. In a skiving and folding machine the following combination of instrumentalities, viz: a skiving device; a feeding device; a bending device; a folding device; a pressing device; and means whereupon they may be actuated; said instrumentalities being organized in operative relation, and the skiving device being adapted to be actuated independently of any other operative part of the machine.

8. In a skiving and folding machine the following combination of instrumentalities, viz: a skiving device; a feeding device; a slitting device; and means whereupon they may be actuated; said instrumentalities being organized in operative relation, and the skiving device being adapted to be actuated independently of any other operative part of the machine.

9. In a skiving and folding machine the following combination of instrumentalities, viz: a skiving device; a feeding device; a slitting device; a bending device; a folding device; a pressing device; and means whereupon they may be actuated; said instrumentalities being organized in operative relation, and the skiving device being adapted to be actuated independently of any other operative part of the machine.

10. In a machine for making a folded edge the followng combination of instrumentalities, viz: means for beveling a piece of leather near its edge; means movable at an angle to the edge of the leather for the purpose of folding the beveled part of said leather; means by which said leather may be moved toward said beveling means and said folding means; said instrumentalities coöperating to make a folded edge of proper length, by repeated action.

11. In a machine for making a folded edge the following combination of instrumentalities, viz: means for beveling a piece of leather near its edge; means in consequence of which the leather is slit through its edge at intervals, said slits extending inward from the edge of the leather toward the body of the leather; means in consequence of which the slit parts of said leather are folded against the body of the leather; and means for moving said leather; said instrumentalities coöperating to make a folded edge of the leather, by repeated action.

12. In a machine for making a folded edge the following combination of instrumentalities, viz: means for beveling a piece of leather near its edge; means in consequence of which the beveled part of the leather is slit through its edge at intervals, said slits extending inward from the edge of the leather toward the body of the leather; and means for presenting said leather to the beveling means, and the slitting means, said slitting means operating upon the leather, by repeated action.

13. In a machine for making a folded edge the following combination of instrumentalities, viz: means for beveling a piece of leather near its edge; means in consequence of which the leather is slit through its edge at intervals, said slits extending inward from the edge of the leather toward the body of the leather; means for applying cement to said leather; means for folding the slit parts of said leather against the body of the leather; and means for moving said leather; said instrumentalities coöperating to make a folded edge of the leather, by repeated action.

14. In a machine for making a folded edge the following combination of instrumentalities, viz: means for beveling a piece of leather near its edge; means in consequence of which the leather is slit through its edge at intervals, said slits extending inward from the edge of the leather toward the body of the leather; means for applying cement to the leather; means adapted to be moved from the edge of the leather inward and to fold the slit parts of the leather against the body of the leather by its inward movement; and means for moving said leather; said instrumentalities coöperating to make a folded edge of the leather, by repeated action.

15. In a machine for making a folded edge the following combination of instrumentalities, viz: means for beveling a piece of leather near its edge; means for slitting the leather through its edge at intervals, said slits extending inward from the edge of the leather toward the body of the leather; means for folding the beveled and slit parts against the body of the leather; and means for presenting said leather to said beveling means, said slitting means, and said folding means; said instrumentalities coöperating to make a folded edge of the leather, by repeated action.

16. The combination of means for slitting entirely through the edge of a piece of leather at intervals, means movable inward from the edge of the leather for folding the slit parts against the body of the leather, means for forcing the slit parts into such relative position with the means for folding that said slit parts may be folded, and a feeding mechanism.

17. In a machine for making a folded edge the following combination of instrumentalities, viz: means in consequence of which a piece of leather is slit entirely through its edge at intervals, said slits extending from the edge of the leather inward toward the body of the leather; means adapted to be moved from the edge of the leather inward to fold the slit parts of the leather on account of its inward movement; and means for moving the leather; said instrumentalities coöperating to make a folded edge, by repeated action.

18. In a machine for making a folded edge the following combination of instrumentalities, viz: means in consequence of which a piece of leather is slit through its edge at intervals, said slits extending inward from the edge of the leather and toward the body of the leather; a recessed means adapted to be moved in a direction inward from the edge of the leather, and adapted to force the slit parts of the leather against the body of the leather, and to rub said slit parts; means for pressing the leather against said means for folding the leather; and means for moving the leather; said instrumentalities coöperating to make a folded edge, by repeated action.

19. In a machine for making a folded edge the following combination of instrumentalities, viz: means in consequence of which a piece of leather is slit entirely through its edge at intervals, said slits extending inward from the edge of the leather and toward the body of the leather; a device for folding the slit parts against the body of the leather, and for rubbing the leather; means for moving the operative part of said device for folding and rubbing the leather in a direction from the edge of the leather inward thereby folding and rubbing said leather; means in consequence of which the leather is held against said means for folding and rubbing; and means for moving the leather; said instrumentalities coöperating to make a folded edge, by repeated action.

20. In a machine for making a folded edge the following combination of instrumentalities, viz: means whereupon a piece of leather may be slit at intervals through its edge; a folding device rotatably supported; means for turning said folding device in a direction from the edge of the leather inward; and means for moving the leather; said instrumentalities coöperating to make a folded edge, by repeated action.

21. The following combination of instrumentalities, viz: a mechanical movable combined folder, rubber and presser designed and adapted to be moved from the edge of the leather inward to fold, rub and press a part of the leather against the body of the leather on account of its inward movement; and means for moving the leather; said instrumentalities coöperating to make a folded edge, by repeated action.

22. The following combination of instrumentalities, viz: means for beveling a piece of leather near its edge; means for operating said means for beveling the leather; means for slitting the leather at intervals through its edge said slits extending from the edge of the leather inward toward the body of the leather; means for operating said means for slitting; and means for moving the leather toward said means for beveling and said means for slitting.

23. The following combination of instrumentalities, viz: a feeding device adapted to move a piece of leather; a mechanism, whereupon, said feeding device may be actuated; a presser-foot or device secured near to said feeding device; a skiving-knife; a mechanism, whereupon, said skiving-knife may be actuated; a slitting device adapted to cut slits through the edge of the leather at intervals; a mechanism, whereupon, said slitting device may be actuated; and a device against which the cutting edge of said slitting device is actuated in cutting said slits.

24. The following combination of instrumentalities, viz: a feeding device adapted to move a piece of leather; a mechanism whereupon said feeding device may be actuated; a presser-foot secured near to said feeding device; means whereupon slits may be cut through the edge of the leather at intervals; a beveled, recessed, disk-shaped device adapted to fold, press and rub leather; a bender device adapted to bend the part of the leather to be folded and press it against the operative part of said beveled, recessed, disk-shaped device; means, whereupon, said beveled, recessed, disk-shaped device may be moved and the operative part of it thereby carried in a direction inward from the edge of the leather; and a suitable presser against which said leather is held while it is pressed and rubbed by said folding, pressing and rubbing device.

25. In a machine for making a folded edge the following combination of instrumentalities, viz: means whereupon a piece of leather may be slit at intervals through its edge; a device for folding leather; means for moving said device for folding the leather in a direction from the edge of the leather inward; means for moving the leather; a presser-foot; a cement-receptacle; and suitable means in consequence of which a proper amount of cement is taken from said cement-receptacle and put upon the leather; said instrumentalities coöperating to make a folded edge of proper length, by repeated action.

26. The following combination of instrumentalities, viz: means for slitting a piece of leather at intervals at its edge; means for operating said means for slitting; a beveled, recessed, disk-shaped device for folding and rubbing leather; a suitable cement-receptacle; suitable means whereupon a sufficient amount of cement may be automatically taken from said cement-receptacle and put upon the recessed surface of said beveled, recessed, disk-shaped device for folding and rubbing leather; means whereupon said beveled, recessed, disk-shaped device may be turned; means for moving the leather; and a presser-foot; said instrumentalities coöperating to make a folded edge, by repeated action.

27. The following combination of instrumentalities, viz: a feeding device adapted to move a piece of leather; a mechanism whereupon said feeding device may be actuated; a presser-foot or device secured near to said feeding device; means whereupon slits may be cut through the edge of the leather at intervals; a beveled, recessed, disk-shaped device adapted to fold press and rub leather; a suitable cement-receptacle; suitable means in consequence of which a specific amount of cement is taken from said cement-receptacle and put upon the operative part of said beveled, recessed, disk-shaped device; a bender device adapted to bend the part of the leather to be folded and press it against the recessed portion of the operative part of said beveled, recessed, disk-shaped device; a mechanism whereupon said bender device may be operated; means whereupon said beveled, recessed, disk-shaped device may be rotated and the operative part of it thereby carried in a direction inward from the edge of the leather, thereby rubbing cement upon said leather and folding, pressing and rubbing said leather; and a suitable device against which said leather is held while it is pressed and rubbed.

28. The following combination of instrumentalities, viz: a feeding device adapted to move a piece of leather; a mechanism whereupon said feeding device may be actuated; a presser-foot or device secured near to said feeding device; a skiving-knife; mechanism whereupon said skiving-knife may be actuated; means whereupon slits may be cut through the edge of the leather at intervals; a beveled, recessed, disk-shaped device adapted to fold press and rub leather; a bender device adapted to bend the skived part of the leather and press it against the recessed portion and operative part of said beveled, recessed, disk-shaped device; a mechanism whereupon said bender device may be actuated; means whereupon said beveled, recessed, disk-shaped device may be rotated and the operative part of it thereby carried in a direction inward from the edge of the leather, thereby folding pressing and rubbing said leather; and a suitable presser against which said leather is held when it is rubbed by said beveled, recessed, disk-shaped device.

29. The following combination of instrumentalities, viz: a feeding device adapted to move a piece of leather; a mechanism whereupon said feeding device may be actuated; a presser-foot or device secured near to said feeding device; a skiving-knife adapted to bevel a piece of leather at its edge; mechanism whereupon said skiving-knife may be actuated; means whereupon slits are cut through the edge of the leather at intervals; a beveled, recessed, disk-shaped device adapted to fold press and rub leather; a suitable cement-receptacle; suitable means whereupon a specific amount of cement is taken from said cement-receptacle and put upon the operative part of said beveled, recessed, disk-shaped device; a bender device adapted to bend the skived part of the leather and press it against the recessed portion of said beveled, recessed, disk-shaped device; mechanism whereupon said bender device may be actuated; means whereupon the beveled, recessed, disk-shaped device may be rotated and the operative part of it thereby carried in a direction inward from the edge of the leather thereby rubbing cement upon the leather, and folding pressing and rubbing the leather; and a suitable device against which said leather is held while it is pressed and rubbed by said beveled, recessed, disk-shaped device.

30. The following combination of instrumentalities, viz: a feeding device adapted to move a piece of leather; a mechanism whereupon said feeding device may be actuated; a presser-foot or device secured near to said feeding device; a beveled, recessed, disk-shaped device adapted to fold press and rub leather; a rotatory disk skiving-knife secured near thereto; a knife-shaft secured to said skiving-knife; an adjustable knife-shaft support for rotatably supporting said knife-shaft; means whereupon said adjustable knife-shaft support may be manually moved and secured in another position to change the relative positions of the cutting edge of the knife and the edge of the operative part of said beveled, recessed, disk-shaped device; a mechanism whereupon said rotatory disk skiving-knife may be actuated; means whereupon slits are cut through the edge of the leather at intervals; a bender device adapted to bend the skived part of the leather and press it against the recessed portion of the operative part of said beveled, recessed, disk-shaped device; a mechanism whereupon said bender device may be actuated; means whereupon said beveled, recessed, disk-shaped device may be rotated and the operative part of it thereby carried in a direction inward from the edge of the leather, thereby folding pressing and rubbing said leather; and a suitable yielding presser against which said leather is pressed while it is pressed and rubbed by said beveled, recessed, disk-shaped device.

31. The following combination of instrumentalities, viz: a feeding device adapted to move a piece of leather; a mechanism whereupon said feeding device may be actuated; a presser-foot or device secured near to said feeding device; a beveled, recessed, disk-shaped device adapted to fold press and rub leather; a rotatory disk skiving-knife secured near thereto; a knife-shaft secured to said skiving-knife; an adjustable knife-shaft support for rotatably supporting said knife-shaft; means whereupon said adjustable knife-shaft support may be manually moved and secured in another position to change the relative positions of the cutting edge of the knife and the edge of the operative part of said beveled, recessed, disk-shaped device; a mechanism whereupon said rotatory disk skiving-knife may be actuated; means whereupon slits are cut through the edge of the leather at intervals; a suitable cement-receptacle; suitable means whereupon a specific amount of cement is taken therefrom and put upon the operative part of said beveled, recessed, disk-shaped device; a bender device adapted to bend the skived part of the leather and press it against the recessed portion of the operative part of said beveled, recessed, disk-shaped device; mechanism whereupon said bender device may be vibrated; means whereupon said beveled, recessed, disk-shaped device may be rotated and the operative part of it thereby carried in a direction inward from the edge of the leather thereby rubbing cement upon the leather and folding pressing and rubbing said leather; and a suitable presser against which the leather is held while it is rubbed by said beveled, recessed, disk-shaped device.

32. A machine for making a folded edge comprising means whereupon a piece of leather may be slit at intervals at its edge; and a disk-shaped device for folding the leather; and a circular knife, said circular knife and said disk-shaped device being adapted to be moved from the edge of the leather inward at the same time for the purpose of skiving and folding the leather; means for moving the leather; and a presser-foot; said instrumentalities being adapted to operate upon the material in near proximity and to coöperate to make a folded edge of desirable length.

33. A machine for making a folded edge comprising means whereupon a piece of leather may be slit at intervals at its edge; and a device for folding leather; and a knife; said knife and said device for folding being adapted to be moved from the edge of the leather inward at the same time for the purpose of skiving and folding the leather; means for moving the leather; and a presser-foot; said instrumentalities being adapted to operate upon the leather in near proximity and to coöperate to make a folded edge of desirable length.

34. In a machine for making a folded edge the following combination of instrumentalities, viz: means for beveling a piece of leather near its edge; means whereupon a piece of leather may be slit at intervals through its edge; means for folding said slit parts so as to make a folded edge; means for moving said leather; and a presser-foot; said instrumentalities coöperating to make a folded edge of proper length, by repeated action.

35. In a machine for making a folded edge the following combination of instrumentalities, viz: means whereupon a piece of leather may be slit entirely through at intervals at its edge; means adapted to be moved from the edge of the leather inward for the purpose of folding the slit parts of the leather against the body of the leather; means for moving the leather; and a presser-foot; said instrumentalities adapted to coöperate to make a folded edge of proper length, by repeated action.

36. In a machine for making a folded edge the following combination of instrumentalities, viz: means in consequence of which a piece of leather may be slit at intervals through its edge, a disk-shaped folder, means for forcing the slit parts into such relative position with said disk-shaped folder that said slit parts may be folded thereby, and means for turning said folder combined with a feeding mechanism.

37. In a skiving and folding machine the following combination of instrumentalities, viz: a skiving mechanism comprising a skiving device, a folding mechanism comprising a folding device, and manually - adjustable means in consequence of which the relative positions of the operative part of the skiving device and the operative part of the folding device may be changed.

In testimony whereof I have affixed my signature in presence of two witnesses.

FRANK L. HARMON.

Witnesses:

MARCUS B. MAY,
C. C. STECHER.